United States Patent [19]

Choudhury et al.

[11] 4,119,186

[45] Oct. 10, 1978

[54] SINGLE LEVER CONTROL HAVING A THROTTLE WARM-UP LEVER

[75] Inventors: Hrishikesh Choudhury, Gurnee, Ill.; Heinrich E. Luksch, Kenosha, Wis.

[73] Assignee: Outboard Marine Corporation, Waukegan, Ill.

[21] Appl. No.: 772,430

[22] Filed: Feb. 28, 1977

[51] Int. Cl.$^2$ .............................................. B60K 41/02

[52] U.S. Cl. ............................... 192/0.096; 74/480 B; 74/483 R; 74/878

[58] Field of Search ...................... 74/480 B, 876, 878, 74/483 R, 523; 192/0.096, 0.098

[56] References Cited

U.S. PATENT DOCUMENTS

| | | | |
|---|---|---|---|
| 2,867,131 | 1/1959 | Schroeder | 192/0.098 X |
| 2,884,109 | 4/1959 | Morse | 192/0.098 |
| 2,987,152 | 6/1961 | Morse | 192/0.098 X |
| 3,117,465 | 1/1964 | Eiermann | 192/0.096 X |
| 3,780,842 | 12/1973 | Whipple et al. | 192/0.096 |

*Primary Examiner*—Howard N. Goldberg
*Attorney, Agent, or Firm*—Michael, Best & Friedrich

[57] ABSTRACT

A single lever control for the throttle and clutch of a marine propulsion device including a housing pivotally supporting both a main control lever and an auxiliary warm-up lever, a throttle lever, and a gear shift lever. The throttle lever is alternately operable to regulate the setting of a remotely located engine throttle in response to movement of either the main control lever from a neutral position or the warm-up lever from an idle position. The gear shift lever is operable to shift an engine clutch in response to initial movement of the main control lever from the neutral position. A lock-out lever mounted inside the housing cooperates with a lock-out plate carried by the warm-up lever and with a recessed, arcuate surface on the gear shift lever to prevent movement of warm-up lever when the main control lever is displaced from the neutral position and to prevent movement of the main control lever when the warm-up lever is displaced from the idle position. In one embodiment, the locking arm of a locking mechanism carried by the main control lever cooperates with a notched index plate mounted on the exterior of the housing and coaxially with the control lever pivot axis to releasably lock the main control lever in the neutral position. In another embodiment, the index plate and the control lever are arranged to afford selective adjustment of the angular orientation of the main control lever so it will be substantially vertical when in the neutral position irrespective of the angular orientation of the housing to the horizontal.

22 Claims, 11 Drawing Figures

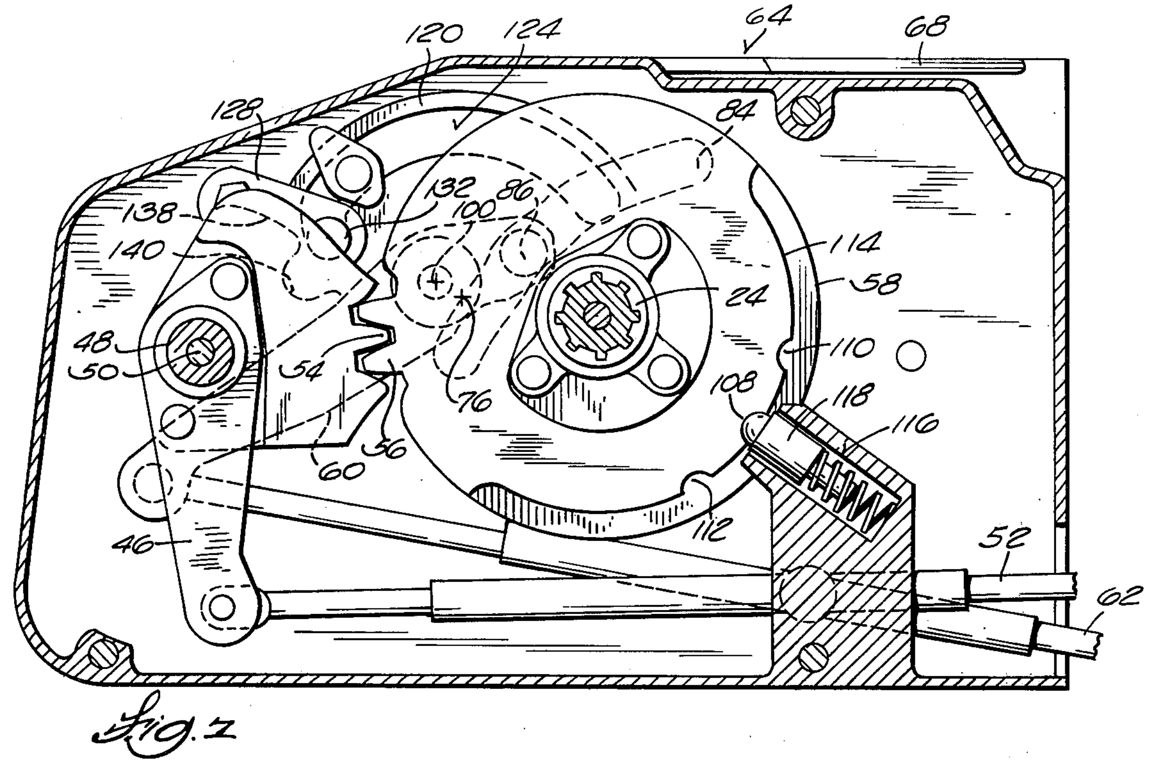
Fig. 7
Fig. 8
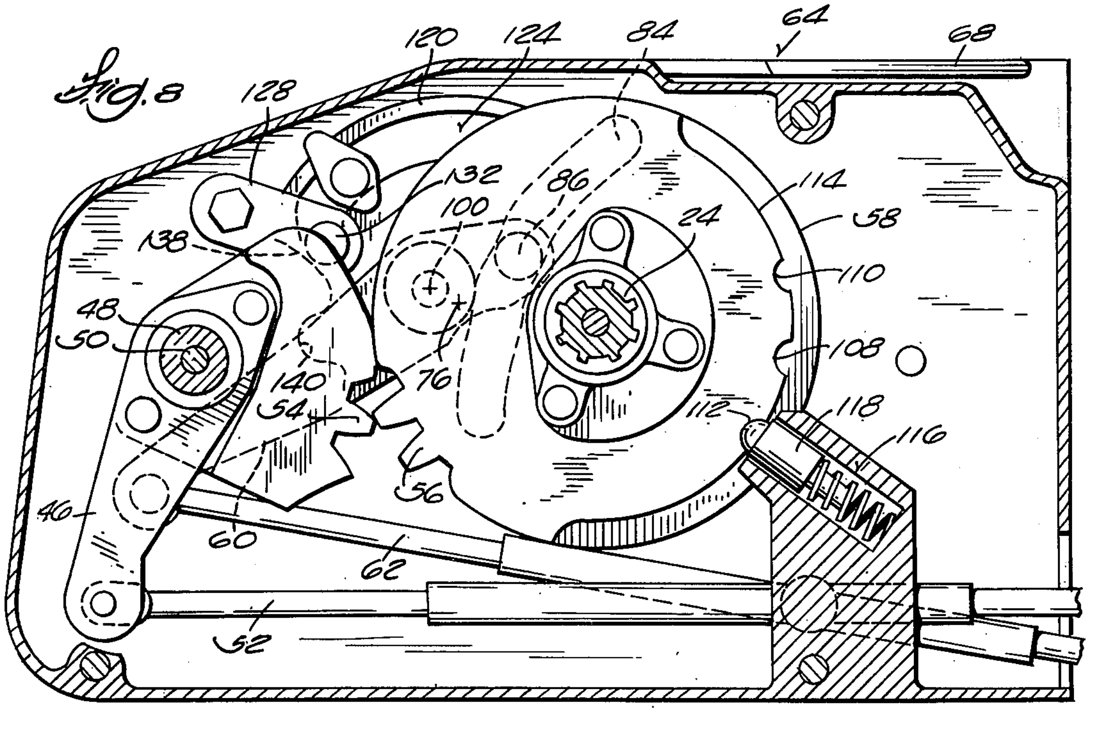

Fig. 11
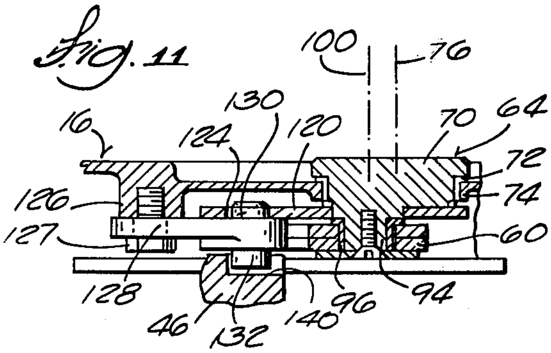
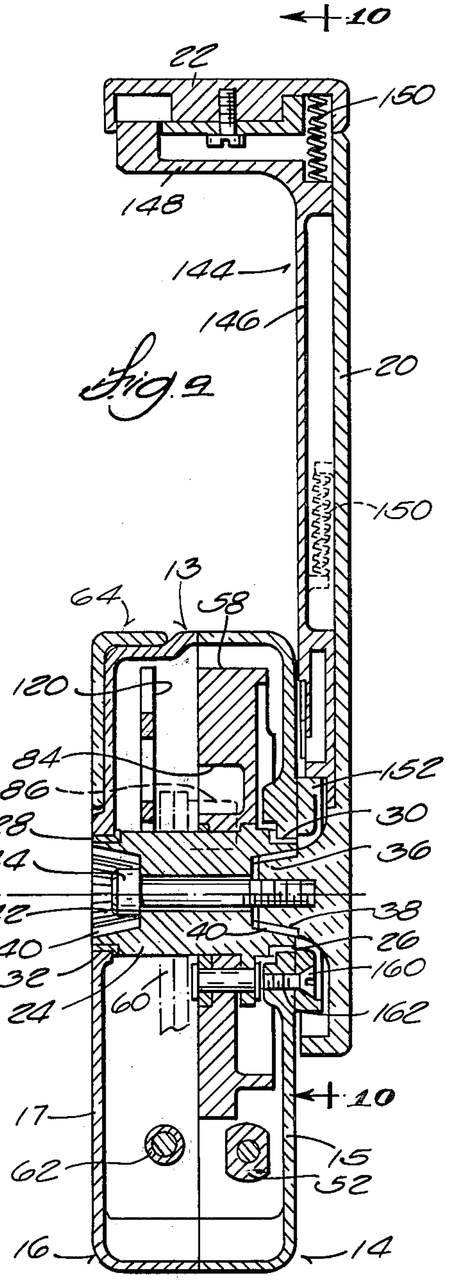
Fig. 9
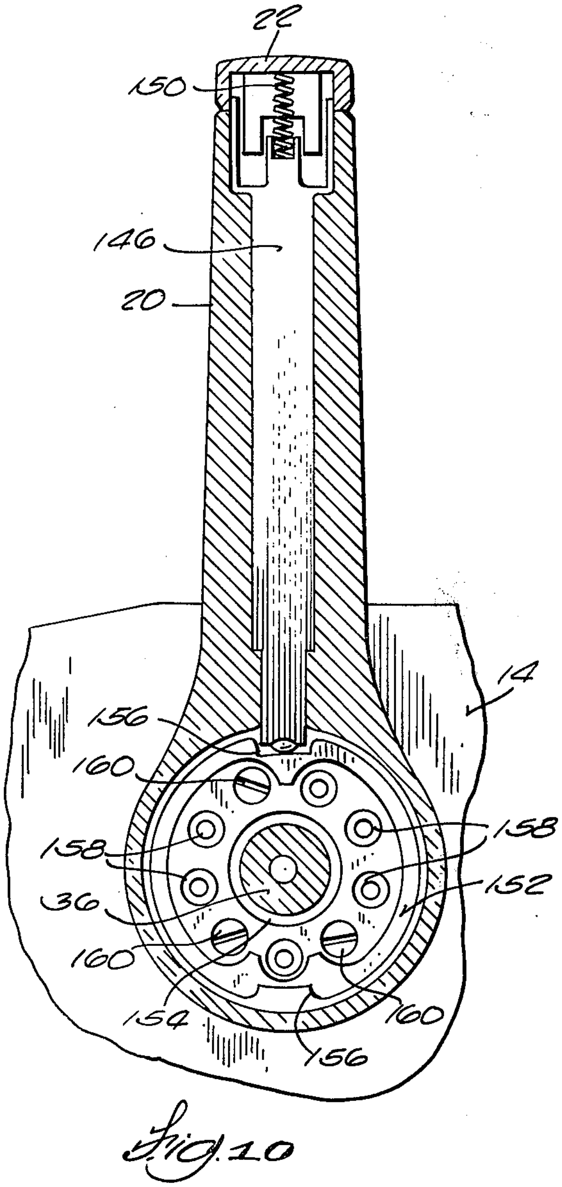
Fig. 10

SINGLE LEVER CONTROL HAVING A THROTTLE WARM-UP LEVER

BACKGROUND OF THE INVENTION

The invention relates generally to single lever controls for regulating the throttle and clutch associated with an internal combustion engine. More specifically, the invention relates to single lever controls for marine propulsion devices, such as outboard motors and stern drive units.

Single lever controls of the above type generally include a main control lever which is pivotally movable in opposite directions from a neutral position through a clutch operating range to effect clutch operation without affecting the engine throttle setting and subsequently through a throttle control range whereby the engine speed is increased without affecting clutch actuation. As a result, clutch actuation occurs before there is an appreciable advancement of the throttle and the clutch cannot be reversed before the throttle is returned to an idle speed setting.

Such single lever controls also commonly include an auxiliary warm-up lever which is selectively operable to control the engine throttle and is movable from an idle position to advanced throttle settings to facilitate engine warm-up while the main control lever is in the neutral position.

It is desirable to provide a lock-out mechanism for preventing the main control lever from being moved from the neutral position any time the warm-up lever is in an engine warm-up position. Examples of prior art single lever controls including an auxiliary warm-up lever and a lockout mechanism are disclosed in the U.S. Whipple et al U.S. Pat. No. 3,780,842, issued Dec. 25, 1973 and the U.S. Saito et al U.S. Pat. No. 3,828,902 issued Aug. 13, 1974. Examples of other prior art single lever control devices are disclosed in the prior art referred to in the Background of the Invention section of the above-identified U.S. Whipple patent.

Prior art single controls including a lockout mechanism typically include means which interengage the main control lever and the warm-up lever and require both levers to be mounted on the same side of the control housing and further require a predetermined orientation of the main control lever when in the neutral position because of the nature of the locking mechanism. Consequently, such prior art constructions are not readily adaptable for mounting the main control lever on either side of the housing or for adjusting the angular orientation of the control lever relative its pivot axis and the longitudinal centerline of the housing so that the control lever will be substantially vertical when in neutral position even though the housing is located at an angle to the horizontal.

SUMMARY OF THE INVENTION

The invention provides a single lever control including a housing pivotally supporting both a main control lever and an auxiliary warm-up lever, together with lockout means operable independently of direct interengagement of the control lever and the warm-up lever for permitting movement of the warm-up lever from the idle position when the control lever is in the neutral position, for preventing pivotal movement of the warm-up lever from an idle position when the control lever is displaced from the neutral position, for permitting movement of the control lever from the neutral position when the warm-up lever is in the idle position and for preventing movement of the control lever from the neutral position when the warm-up lever is displaced from the idle position.

In one embodiment, the main control lever is pivotally movable from a neutral position, through a shift position and subsequently through a range of throttle advance positions, the warm-up lever is pivotally movable between an idle position and a range of engine warm-up positions and there is provided a gear shift lever which is adapted to actuate an engine clutch and is carried by the housing for pivotal movement between a neutral position and a drive position, together with means connecting the warm-up lever and the gear shift lever to provide the above-described functions of the lockout means.

In one embodiment, the single lever control includes a housing, a main lever supported from the housing for pivotal movement about a first axis from a neutral position, through a shift position, and subsequently through a range of throttle advance positions, a warm-up lever carried by the housing for pivotal movement about a second axis between an idle position and a range of engine warm-up positions, a throttle lever adapted to actuate a remotely located throttle of an engine and carried by the warm-up lever for pivotal movement about a third axis spaced from the second axis, and a gear shift lever adapted to actuate the clutch of the engine and carried by the housing for pivotal movement, in response to movement of the control lever, about a fourth axis between a neutral position and a drive position. A lockout lever pivotally carried by the housing, preferably interiorly of the housing, is connected to the warm-up lever by means for locating the lockout lever in a first position when the warm-up lever is in the idle position and for locating the lockout lever in a second position when the warm-up lever is in an engine warm-up position. The lockout lever is connected to the gear shift lever by means for permitting movement of the warm-up lever from the idle position when the control lever is in the neutral position, for preventing movement of the warm-up lever from the idle position when the control lever is displaced from the neutral position, for preventing movement of the gear shift lever from the neutral position when the warm-up lever is in an engine warm-up position, and thereby also preventing movement of the control lever from the neutral position, and for permitting movement of the gear shift lever when the warm-up lever is in the idle position, and thereby also permitting movement of the control lever from the neutral position.

In one embodiment, the housing has opposed side wall members and the control lever is carried by a shaft journalled at its opposite ends by the housing side wall members. This shaft and the control lever are arranged so that the control lever can be conveniently mounted on either end of the shaft and, thus, on either side of the housing. The housing preferably is provided with a recessed portion for receiving and accommodating pivotal movement of the warm-up lever so that two or more housings can be conveniently stacked together in side-by-side relationship to provide a dual control unit without interferring with the operation of the warm-up levers for the two controls.

In one embodiment, a locking mechanism is provided for releasably locking the control lever in the neutral position. Preferably, this locking mechanism includes a circular index plate which is mounted on the exterior of the housing coaxially with the control lever pivot axis and has a notch located in a position corresponding to the neutral position of the control lever and a locking arm which is slidably mounted on the control lever and is spring biased into the index plate notch when the control lever is in the neutral position.

In one embodiment, the index plate, the control lever and the shaft carrying the control lever are arranged to afford selective adjustment of the angular orientation of the control lever relative to the housing and to the shaft so the control lever will be substantially vertical irrespective of the angular orientation of the longitudinal centerline of the housing to the horizontal.

The invention further provides a single lever control including a housing having opposed side wall members, a shaft journalled at the opposite ends by the side wall members, a throttle lever disposed in the housing and adapted to actuate an engine throttle in response to movement of the throttle lever, a warm-up lever, means mounting the warm-up lever on one of the side wall members for pivotal movement from an idle position and connecting the warm-up lever to the throttle lever to provide movement of the throttle lever in response to movement of the warm-up lever from the idle position, a control lever, means on the control lever and on said shaft for mounting the control lever with either of the opposite ends of the shaft for pivotal movement of the control lever from a neutral position to a range of throttle advance positions, and means connecting the control lever and the throttle lever for moving the throttle lever in response to movement of the control lever from the neutral position to a throttle advance position.

One of the principal features of the invention is the provision of a single lever control including a housing pivotally supporting both a main control lever and an auxiliary warm-up lever and a lockout mechanism which is operable independently of direct interengagement between the control lever and the warm-up lever so as to permit the control lever to be located exteriorly of either side of the housing and to permit pairs of the controls to be stacked together with the housing in side-by-side relationship.

Another principal feature of the invention is the provision of a single lever control including a housing having opposed side wall members in which a shaft is journalled at the opposite ends, a control lever, and means on the shaft and on the control lever for mounting the control lever on either of the opposite ends of the shaft and exteriorly of the housing for pivotal movement of the control lever from a neutral position through a range of throttle advance positions.

A further principal feature of the invention is the provision of a single lever control including a housing pivotally supporting a main control lever and means for affording selective adjustment of the control lever relative to the housing so that the control lever is substantially vertical when in the neutral position irrespective of the longitudinal centerline of the housing.

Other features and advantages of the invention will become apparent to those skilled in the art upon reviewing the following detailed description, the drawings and the appended claims.

BRIEF DESCRIPTION OF THE DRAWINGS

FIG. 7 is an enlarged sectional view taken generally along line 7—7 in FIG. 2, illustrating the location of various of the components when the warm-up lever is in the idle position and the main control lever is in the neutral position.

FIG. 8 is a view similar to FIG. 7, illustrating the location of various of the components when the warm-up lever is in the idle position and the main control lever is in a forward shift position.

FIG. 9 is an enlarged sectional view taken generally along line 9—9 in FIG. 1.

FIG. 10 is a fragmentary, sectional view taken generally along line 10—10 in FIG. 9.

FIG. 11 is a fragmentary sectional view taken generally alone line 11—11 in FIG. 5.

Figure 1:
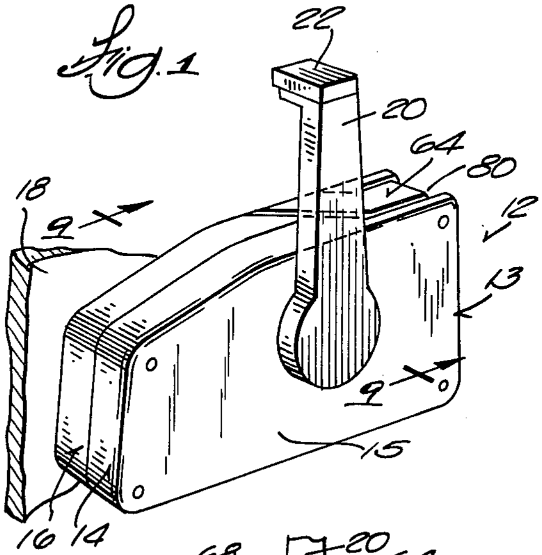
FIG. 1 is a perspective view of a single lever control which is particularly adapted for use with a marine propulsion device and embodies various of the features of the invention.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawings is a single lever control 12 for operating the clutch and throttle of a remotely located marine propulsion device, such as an outboard motor or stern drive unit. The single lever control 12 includes a housing 13 comprised of opposed cover halves or sections 14 and 16 which include respective side walls 15 and 17 and which are suitably fastened together to form a generally closed housing.

Figure 2:
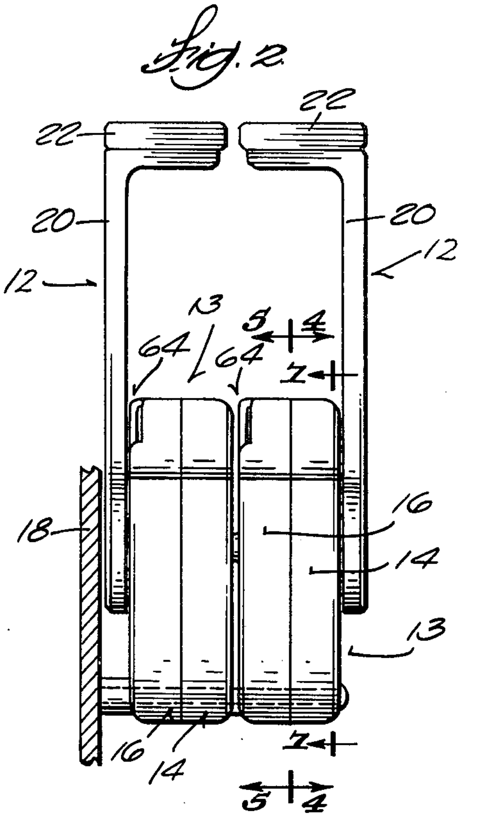
FIG. 2 is an end elevational view of a pair of the single lever controls illustrated in FIG. 1, shown stacked together in side-by-side relationship.

The single lever control 12 can be used singularly for controlling one propulsion device in which case, as shown in FIG. 1, the housing 13 can be mounted on the vertical side panel 18 (illustrated fragmentarily) of a control console. One of the important advantages of the invention to be explained below is the capability for two of the single lever controls 12 to be conveniently assembled for controlling two propulsion devices by simply stacking them together in side-by-side relationship and mounting the stacked assembly on the side panel 18 of a control console as illustrated in FIG. 2. In either case, the housing 13 can be arranged for mounting on a laterally extending panel of a control console. When paired together to provide a dual control unit, the single lever controls 12 are identical except the main control levers 20 thereof are mounted on opposite sides of the housing 13. Therefore, the construction and operation of only one control will be described in detail.

The main control lever 20 has a laterally extending hand knob 22 on the upper end and is mounted at the lower end for pivotal movement relative to and exteriorly of the housing 13. Provided for this purpose (See FIG. 9) is a central hub or shaft 24 which is more or less centrally located in the housing 13 with the opposite ends extending through bearings 26 and 28 provided in apertures 30 and 32 located in respective cover sections 14 and 16. The shaft 24 is suitably connected to the main control lever 20 for common rotation therewith about a laterally extending axis 34.

In the preferred construction illustrated (See FIG. 9), the main control lever 20 is provided on the lower end with a laterally extending stud or boss 36 including a plurality of circumferentially spaced external splines 38 and each end of the shaft 24 is provided with a recess 40 including a plurality of circumferentially spaced internal splines 42 for receiving the main control lever boss 36. The main control lever 20 is fastened on the shaft 24 by a bolt 44 which extends through a central bore in the shaft 24 and is threaded into the main control lever boss 36.

With this arrangement, the main control lever 20 can be conveniently mounted on either end of the shaft 24, thereby permitting the main control lever 20 to be mounted exteriorly of either side of the housing 13 without making any structural modifications to, without otherwise altering the assembly of, and without affecting the operation of the single lever control 12 as will be explained below. Thus, unlike most prior art constructions, two or more of the single lever controls 12 can be conveniently stacked in side-by-side relationship and the main control lever 20 can be located on either side of a housing 13, depending on which side is most convenient for the particular installation.

Clutch control is provided (See FIGS. 4, 7 and 8) by a gear shift arm or lever 46 mounted on a stud or boss 48 projecting from the inside of the cover section 14 for pivotal movement about a laterally extending axis 50. The lower end of the gear shift lever 46 is adapted for connection to a push-pull link or cable 52 which is operatively connected to a remotely located engine clutch (not shown). The gear shift lever 46 includes a gear segment 54 which meshes with a cooperating gear segment 56 provided on a generally circular throttle control plate 58 which is fixedly mounted on the shaft 24 for common rotation therewith. Thus, movement of the main control lever 20 serves to rock the shift lever 46 about its pivot axis 50 to actuate the engine clutch.

Throttle control is provided (See FIGS. 5, 6, 7 and 8) by a throttle arm or lever 60 which, at its lower end, is adapted for connection to a push-pull link or cable 62 operatively connected to a remotely located engine throttle (not shown). The throttle lever 60 is alternately operable to regulate the setting of the engine throttle in response to movement of either the main control lever 20 or an auxiliary warm-up lever 64 (See FIGS. 1, 2 and 3).

Means are provided for pivotally mounting the warm-up lever 64 on and exteriorly of the housing 13 in a manner whereby the warm-up lever 64 can be conveniently actuated without interferring with stacking a pair of the housings 13 in side-by-side relationship and/or mounting the main control lever 20 on either of the opposite sides of the housing.

In the specific construction illustrated (See FIGS. 3, 6 and 11), the warm-up lever 64 includes a side link 66, a laterally extending handle 68 on the upper end of the side link 66, and (See FIG. 11) a first stud or boss 70 fixedly projecting from the lower end of the side link 66. As best shown in FIG. 11, the boss 70 extends through a bearing 72 provided in an aperture 74 located in the cover section 16 for pivotal movement of the warm-up lever 64 relative to the housing 13 about a laterally extending axis 76.

Figure 5:
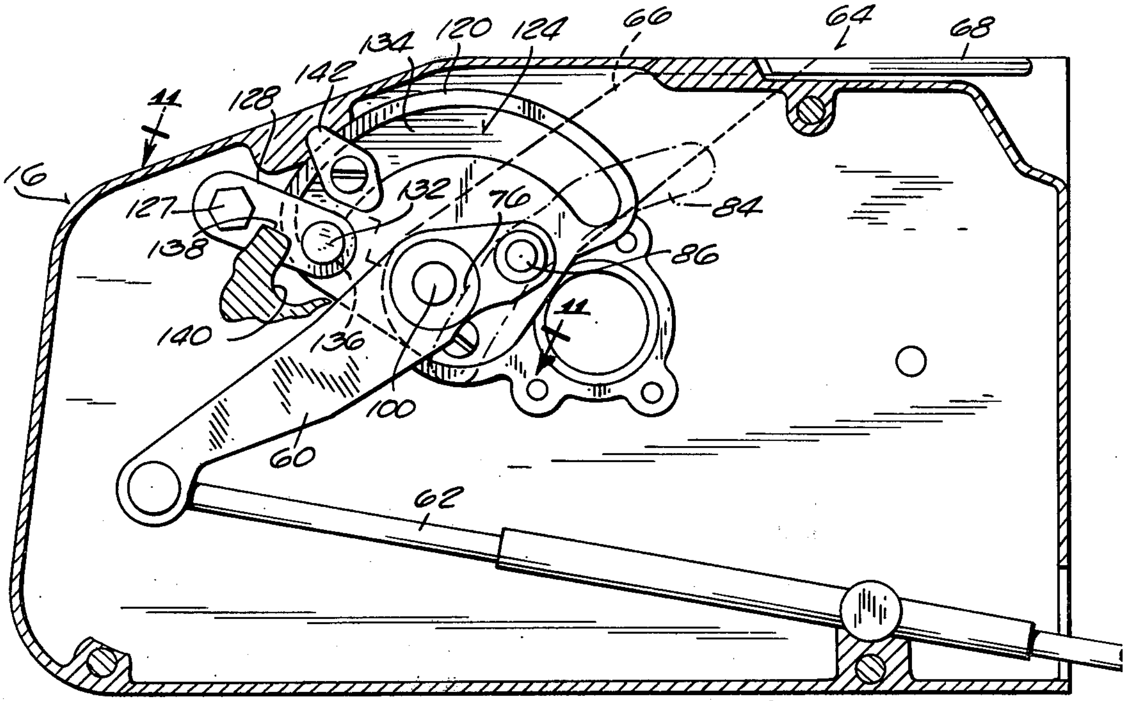
FIG. 5 is an enlarged sectional view taken generally along line 5—5 in FIG. 2, illustrating the location of various of the components when the warm-up lever is in the idle position and the main control lever is in the neutral position.
Figure 6:
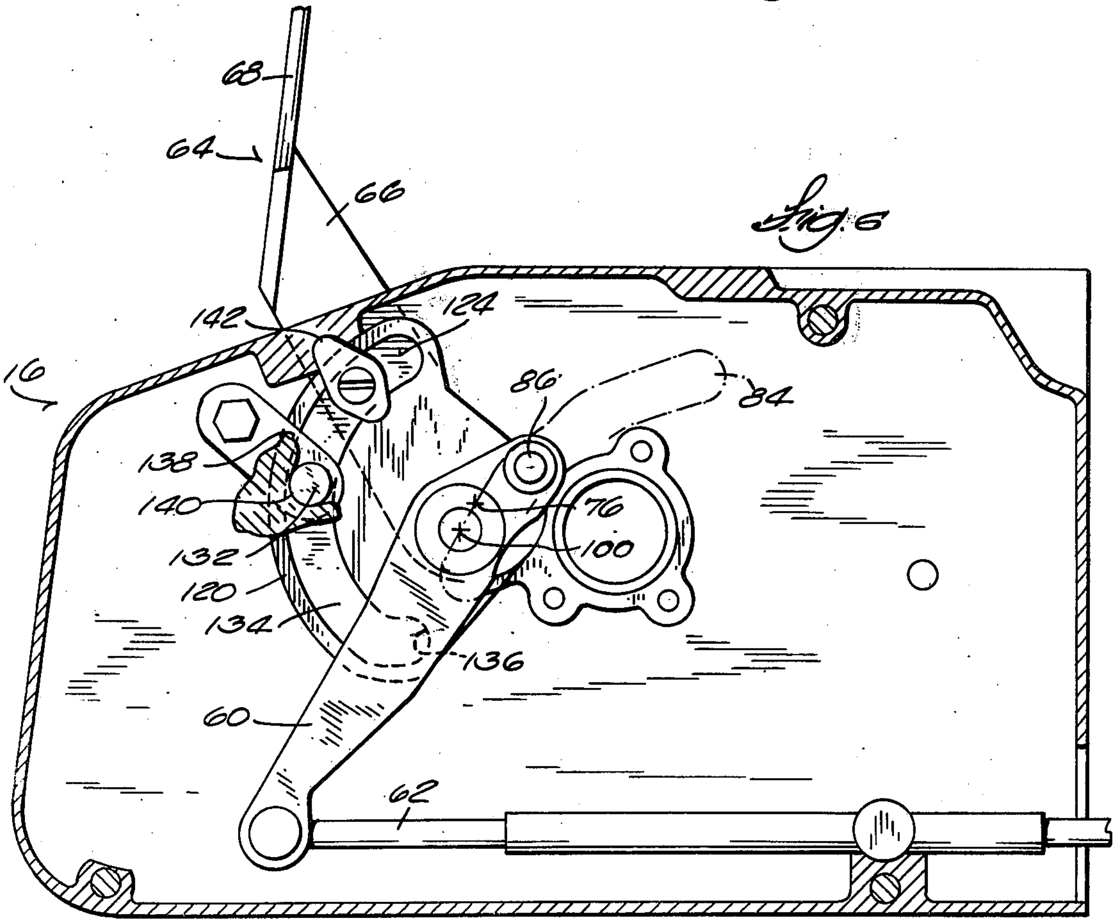
FIG. 6 is a view similar to FIG. 5, illustrating the location of various of the components when the warm-up lever is in a throttle advance position and the main control lever is in the neutral position.

In operation, the warm-up lever 64 is pivotally movable about its pivot axis 76 between an idle position shown in FIG. 5 and an engine warm-up position shown in FIG. 6. The warm-up lever 64 is dimensioned so that it can be conveniently lifted upwardly to a position corresponding to a maximum throttle setting for engine warm-up without engaging the main control lever knob 22.

Figure 3:
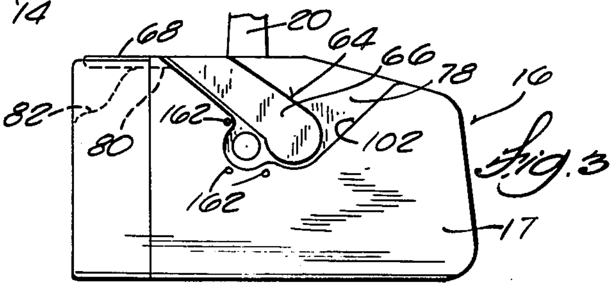
FIG. 3 is a reduced, partial side elevational view of the control shown in FIG. 1.

As best shown in FIG. 3, a recessed portion 78 is provided in the upper side portion of the cover section 16 for accommodating the side link 66 of the warm-up lever 64 and (See FIGS. 1 and 3) a recessed portion 80 is provided in the top portions of the cover sections 14 and 16 for accommodating the handle 68 of the warm-up lever 64. The recessed portion 78 is arranged so that the outermost surface of the side link 66 is either substantially flush with or slightly inset from the outer surface of the cover section 16. The recessed portion 80 preferably is arranged such that the top surface of the handle 68 of the warm-up lever 64 is substantially flush with the top surface of the housing 13 when the warm-up lever 64 is in an idle position. The recessed portion 80 preferably is provided (See FIG. 3) with an offset portion 82 which is located adjacent the outer edge of the housing 13 and is arranged to accommodate the operator's fingers so as to facilitate lifting the warm-up lever 64 to an engine warm-up position.

Means are provided for operatively connecting the throttle lever 60 to the main control lever 20 and to the warm-up lever 64 so that movement of the throttle lever 60 is controlled in response to movement of either the main control lever 20 or the warm-up lever 64.

Figure 4:
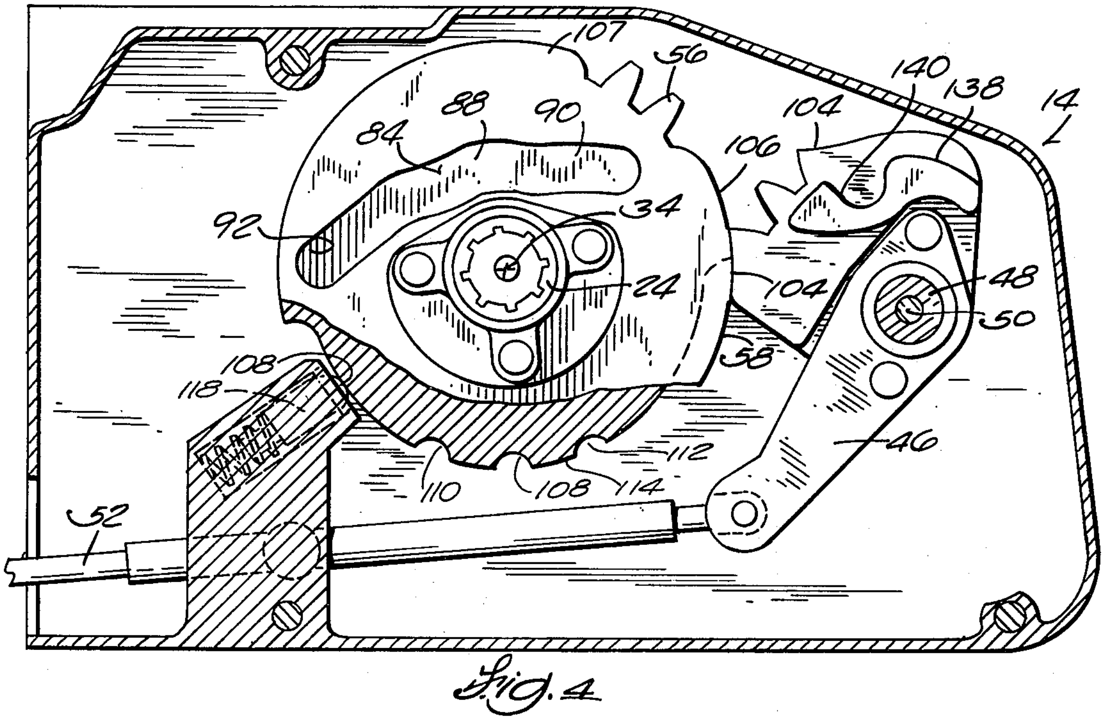
FIG. 4 is an enlarged sectional view taken generally along the line 4—4 in FIG. 2, illustrating the location of various of the components when the warm-up lever is in the idle position and the main control lever is in the reverse speed range.

In the preferred construction illustrated, the means for connecting the throttle lever 60 to the main control lever 20 (See FIGS. 5, 6 and 9) includes a throttle slot or cam 84 in the throttle control plate 58 and a roller or follower 86 which is pivotally mounted on the upper end of the throttle lever 60 and is received in the throttle cam 84. As best shown in FIG. 4, the throttle cam 84 includes a central portion 88 formed at a uniform radius from the shaft axis 34 and oppositely extending end portions 90 and 92 which project in the direction away from the central portion 88 at distances from the shaft axis 34 which increase with increasing distances from the central portion 88.

In the preferred construction illustrated (See FIGS. 5, 6 and 11), the means for connecting the warm-up lever 64 to the throttle lever 60 includes a second stud or boss 94 (See FIG. 11) which fixedly projects from the first boss 70 on the warm-up lever 64, which is located in spaced relation to the first boss 70 (i.e., is eccentric with respect to the first boss 70), and which extends into a bearing 96 provided in an aperture located at an intermediate position of the throttle lever 60. The throttle lever 60 is pivotal relative to the warm-up lever 64 about a laterally extending axis 100 provided by the second boss 94 on the warm-up lever 64. The warm-up lever 64 and the throttle lever 60 are pivotal as an entity relative to both the housing 13 and the main control lever 20 about the pivot axis 76 provided by the first boss 70 on the warm-up lever 64. Thus, as the warm-up lever 64 is moved from the idle position shown in FIG. 5 to an engine warm-up position as shown in FIG. 6, the throttle lever 60 is rotated relative to the throttle control plate 58 about the pivot axis provided by the follower 86 so as to advance the engine throttle from idle.

While other means can be provided for limiting the amount which the throttle lever 60 can be advanced during engine warm-up, in the preferred construction illustrated, clockwise rotation of the warm-up lever 64, as viewed in FIG. 3, is limited primarily by engagement of the upper edge of the side link 66 with a surface 102 of the recessed portion 78.

The cooperating gear segments 54 and 56 on the gear shift lever 46 and on the throttle control plate 58 are arranged so that, when the main control lever 20 is moved in either rotative direction from the neutral position shown in FIG. 7, the gear shift lever 46 is moved to a drive position to actuate the engine clutch. Such clutch actuation occurs promptly upon movement of the main control lever 20 from the neutral position.

The throttle cam 84 is shaped so that the throttle lever follower 86 travels through the central portion 88 without displacing the throttle lever 60 as the gear shift lever 46 is moved to actuate the engine clutch in response to the initial movement of the main control lever 20 from a neutral position. Upon completion of clutch actuation, the throttle lever follower 86 enters one of the extending end portions 90 and 92 of the throttle cam 84, depending on the rotational direction of the main control lever 20, and causes the throttle lever 60 to be rotated about the axis 100 to a throttle advance position, thereby advancing the engine throttle from idle without affecting the setting of the shift lever 46.

Means are provided for preventing movement of the gear shift lever 46 from a drive position when the main control lever 20 is moved beyond a shift position to a throttle advance position. In the preferred construction illustrated (See FIG. 4), such means comprises providing the gear shift lever 46 with arcuate surfaces 104 adjacent and extending from the gear segment 54. Each of the arcuate surfaces 104 is formed to slidably engage one of the arcuate peripheral surfaces 106 and 107 on the throttle control plate 58 extending circumferentially in opposite directions from the gear segment 56, when the gear shift lever 46 is in a drive position and the main control lever 20 is in a throttle advance position. That is, the surfaces 106 and 107 extend along a common radius from the control lever pivot axis 34 and the surfaces 104 extend along approximately the same common radius from the axis 34 when the gear shift lever 46 is in a drive position. This engagement prevents rotation of the shift lever 46 relative to the housing 13 until the main control lever 20 is returned to a shift position where the throttle control plate gear segment 56 meshes with the shift lever gear segment 54.

Means are provided to give the operator a "feel" when the main control lever 20 has been moved from the neutral position to a position corresponding to full clutch actuation. In the preferred construction illustrated (See FIGS. 7 and 8), such means includes three circumferentially spaced, partially spherical recesses 108, 110, and 112 provided in a generally semicircular surface 114 on the throttle control plate 58 and a detent mechanism 116 suitably supported inside the cover section 14. The recesses 108, 110 and 112 are located at positions corresponding to neutral, full reverse, and full forward positions of the engine clutch, respectively. The detent mechanism 116 includes a plunger 118 which is spring biased towards the throttle control plate surface 114 for releasable engagement with the recesses 108, 110 and 112.

Means operable independently of direct interengagement between the warm-up lever 64 and the main control lever 20 are provided for permitting pivotal movement of the warm-up lever 64 from the idle position when the main control lever 20 is in the neutral position, for permitting pivotal movement of the main control lever 20 from the neutral position when the warm-up lever 64 is in the idle position, for preventing pivotal movement of the warm-up lever 64 from the idle position when the main control lever 20 is displaced from the neutral position, and for preventing pivotal movement of the main control lever 20 from the neutral position when the warm-up lever 64 is displaced from the idle position.

In the preferred construction illustrated (See FIGS. 5, 6 and 11) such means includes a generally semicircular lockout plate 120 which is located inside the housing 13, which is fixedly connected to the first boss 70 (See FIG. 11) on the warm-up lever 64 for common rotation with the warm-up lever 64 about its pivot axis 76, and which includes a lockout slot or cam 124. Pivotally mounted on a stud or boss 126 projecting from the inside of the cover section 16, such as by a bolt 127, is a lockout lever 128 having a laterally extending, fixed follower 130 which is received in the lockout cam 124 and a laterally extending, fixed projection 132 which extends generally coaxially with and in the opposite direction from the follower 130.

As best shown in FIG. 5, the lockout cam 124 includes a main portion 134 formed at a uniform radius from the warm-up lever pivot axis 76 and an end portion 136 which extends radially inwardly from the main portion 134. The end portion 136 receives the lockout lever follower 130 when the warm-up lever 64 is in the idle position as shown in FIGS. 5 and 7.

The gear shift lever 46 is provided with an arcuate surface 138 which extends along a common radius from the shift lever pivot axis 50 and includes a radially inwardly extending recess 140 for receiving the lockout lever projection 132. The recess 140 is located so that the lockout lever projection 132 can only travel thereinto when the shift lever 46, and thus the main control lever 20, is in the neutral position. As shown in FIG. 5, the lockout cam 124 is arranged so that, when the warm-up lever 64 is in the idle position, the lockout lever 128 is located in a first position where the projection 132 is held away from engagement with the gear shift lever surface 138.

During initial movement of the warm-up lever 64 from the idle position when the main control lever 20 is in the neutral position, the end portion 136 of the lockout cam 124, acting on the lockout lever follower 130, causes the lockout lever 128 to be rotated about the pivot axis provided by the bolt 127 (clockwise as viewed in FIG. 5) to a second position as the projection 132 travels into the recess 140 (See FIG. 6). When the lockout lever 128 is in this position, the follower 130 is free to travel through the main portion 134 of the lockout cam 124, thereby permitting the warm-up lever 64 to be rotated to an engine warm-up position. The main portion 134 of the lockout cam 124 locks the projection 132 in the recess 140 during rotation of the warm-up lever 64. As a consequence, this location of the projection 132 in the recess 140 prevents movement of the gear shift lever 46, and thus the main control lever 20, from the neutral position until the warm-up lever 64 is returned to the idle position, at which time the lockout lever 128 is returned to the first position shown in FIG. 5 where the projection 132 is retracted from the recess 140.

When the main control lever 20 is displaced from the neutral position as shown in FIG. 8, attempted movement of the warm-up lever 64 from the idle position is prevented by virtue of the recess 140 being located at a position where the projection 132 engages the arcuate surface 138, rather than traveling into the recess 140, and the lockout lever 128 cannot be rotated to the second position. As a consequence, the end portion 136 of the lockout cam 124 engages the lockout lever follower 130 and thereby prevents rotation of the warm-up lever 64. Thus, the warm-up lever 64 can only be moved from the idle position when the main control lever 20 is in the neutral position.

The lockout plate 120 is restricted to pivotal movement in a single plane so as to minimize wobbling by providing a clip 142 (See FIG. 5) which overlies and slidably engages the surfaces of the lockout plate 120 on the opposite sides of the lockout cam 124 and which is suitably mounted on the interior of the cover section 16.

The main control lever 20 is positively and releasably locked in the neutral position by providing (See FIGS. 9 and 10) a neutral lock mechanism 144 including a locking slide or arm 146 slidably mounted on the inner side of the main control lever 20, a hand grip 148 which extends laterally from the upper end of the arm 146 and is located beneath the knob 22, and a spring 150 interposed the knob 22 and the locking arm 146 as shown by solid lines in FIGS. 9 and 10, or interposed the lever 20 and the locking arm 146 as shown by the dashed lines in FIG. 9 and biasing the locking arm 146 and the hand grip 148 in a direction away from the knob 22.Mounted on the exterior of the cover section 14 coaxially with the shaft axis 34 is a generally circular index plate 152 including a central aperture 154 through which the main control lever boss 36 extends and one or more notches 156 adapted to receive the lower end of the locking arm 146 and releasably lock the main control lever 20 in a neutral position.

To operate the main control lever 20, the hand grip 148 is squeezed against the spring 150 by the operator to raise the lower end of the locking arm 146 from the index plate notch 156, thereby unlocking the main control lever 20 so it can be rotated in either direction from the neutral position. When the main control lever 20 is returned to the neutral position, the spring 150 urges the lower end of the locking arm 146 back into the index plate notch 156 to releasably but positively lock the main control lever 20 in the neutral position.

Means are provided on the housing 12 and the main control lever 20 for affording selective adjustment of the angular orientation of the main control lever 20 so it will be substantially vertical when in a neutral position, irrespective of the angular orientation of the longitudinal centerline of the housing 12 with respect to the horizontal or the angular orientation of the warm-up lever 64 when in the idle position.

In the construction illustrated (See FIGS. 9 and 10), such means includes providing the index plate 152 with two diametrically opposed notches 156 and with a plurality of openings 158 circumferentially spaced at equal angular intervals, together with providing the splines 38 and 42 on the main control lever boss 36 and in the central shaft recesses 40. The index plate 152 is mounted on the housing 12 by a plurality (e.g., 3) of screws 160, each extending through an opening 158 and threaded into a tapped mounting hole 162 (one shown in FIG. 9) provided in the cover section 14. Thus, by rotating the index plate 152 relative to the housing 12, the notches 156 can be located at a plurality of angular positions with the mounting screws 160. The splines 38 and 42 on the main lever boss 36 and in the central shaft recesses 40 are arranged so that, after the index plate 152 has been located to provide the desired angular position of the notch 156 relative to the longitudinal axis of the housing 13, the main control lever 20 can be mounted on the shaft 34 at a corresponding angular position where the lower end of the locking arm 146 is axially aligned with the notch 156.

In the specific construction illustrated, the index plate 152 has nine of the openings 158 which are 40° apart with one located on the diametrically extending centerline of the notches 156 and the main control lever boss 36 and each of the shaft recesses 40 has 18 complementary splines which are 20° apart. With this arrangement, the neutral position of the main control lever 20 can be selectively adjusted in 20° increments, depending on which one of the notches 156 is used for the neutral lock. That is, when the notch 156 located between adjacent openings is used for the neutral lock (i.e., the upper notch 156 in FIG. 10), the neutral position of the control lever 20 can be adjusted in nine 40° increments by rotating the index plate 152 from the position shown to positions where another set of openings 158 are aligned with the housing mounting holes 162 and rotating the main control lever 20 relative to the shaft axis a corresponding amount before mounting on the shaft 24. An additional nine 40° increments offset from the first set of increments can be obtained by rotating the index plate 152 to a position where the notch 156 located on the diametric centerline is used for the neutral lock (i.e., the lower notch 156 in FIG. 10). These increments are located midway between the previously described increments.

The cover section 16 also includes a plurality of mounting holes 162 arranged in the same manner as the mounting holes 162 in the cover section 14 so that an index plate 152 can be mounted on the opposite side of the housing 13 to provide the above-described neutral locking and selective angular adjustability of the main control lever 20 when it is mounted on the opposite side of the housing 13.

Various of the features of the invention are set forth in the following claims.

We claim:

1. A single lever control comprising a housing, a main control lever, means supporting said control lever from said housing for pivotal movement about a first axis from a neutral position, through a shift position, and subsequently through a range of throttle advance positions, a warm-up lever carried by said housing for pivotal movement about a second axis between an idle position and a range of engine warm-up positions, a throttle lever adapted to actuate a remotely located throttle of an engine and carried by said warm-up lever for pivotal movement about a third axis spaced from said second axis, means connecting said control lever and said throttle lever for pivoting said throttle lever about said third axis in response to movement of said control lever from the neutral position to a throttle advance position and for permitting pivotal movement of said throttle lever in response to movement of said warm-up lever from the idle position, a gear shift lever adapted to actuate a remotely located clutch of the engine and carried by said housing for pivotal movement about a fourth axis between a neutral position and a drive position, means connecting said gear shift lever and said control lever for pivoting said gear shift lever from the neutral position to the drive position in response to movement of said control lever from the neutral position to a shift position, a lockout lever pivotally carried by said housing, means connecting said lockout lever and said warm-up lever for locating said lockout lever in a first position when said warm-up lever is in the idle position and for locating said lockout lever in a second position when said warm-up lever is in an engine warm-up position, and means connecting said lockout lever and said gear shift lever for permitting movement of said warm-up lever from the idle position when said control lever is in the neutral position, for preventing movement of said warm-up lever from the idle position when said control lever is displaced from the neutral position, for preventing movement of said gear shift lever from the neutral position when said warm-up lever is in an engine warm-up position, and thereby also preventing movement of said control lever from the neutral position, and for permitting movement of said gear shift lever from the neutral position when said warm-up lever is in the idle position, and thereby also permitting movement of said control lever from the neutral position.

2. A single lever control according to claim 1 wherein said means connecting said gear shift lever and said control lever includes means for preventing movement of said gear shift lever from the drive position when said control lever is moved beyond the shift position to a throttle advance position.

3. A single lever control according to claim 2 wherein said means for preventing movement of said gear shift lever from the drive position when said control lever is in a throttle advance position includes a plate mounted for common rotation with said control lever and having a first arcuate limiting surface extending along a common radius from said first axis, and a second arcuate limiting surface on said gear shift lever extending along a common radius from said first axis when said gear shift lever is in a drive position and adapted to engage said first limiting surface and thereby prevent movement of said gear shift lever when said gear shift lever is in a drive position and said control lever is in a throttle advance position.

4. A single lever control according to claim 1 wherein said means connecting said warm-up lever and said lockout lever includes a lockout plate mounted on said warm-up lever interiorly of said housing and having a cam slot therein and further includes a follower on said lockout lever projecting into said lockout plate slot.

5. A single lever control according to claim 4 wherein said lockout plate slot includes a main portion extending at a uniform radius from said third axis and an end portion extending from said main portion inwardly towards said third axis, and wherein said lockout lever follower is located in said end portion of said lockout plate slot when said warm-up lever is in the idle position and, in response to movement of said warm-up lever from the idle position when said gear shift lever is in the neutral position, locates said lockout lever in the second position where said lockout lever follower can move along said main portion of said lockout plate slot and thereby permit said warm-up lever to be moved to an engine warm-up position.

6. A single lever control according to claim 1 wherein said means connecting said lockout lever and said gear shift lever includes a surface extending on said gear shift lever and having an arcuate portion extending along a common radius from said fourth axis and a recess extending from said common radius portion inwardly towards said fourth axis and further includes a projection on said lockout lever, said projection being located in a position for engagement with said arcuate portion to thereby prevent pivotal movement of said warm-up lever from the idle position when said gear shift lever is in the drive position and being located in a position for travel into said recess when said gear shift lever is in the neutral position to thereby prevent pivotal movement of said gear shift lever from the neutral position when said warm-up lever is in an engine warm-up position.

7. A single lever control according to claim 6 wherein said lockout lever is pivotally mounted interiorly of said housing.

8. A single lever control according to claim 1 wherein said means connecting said control lever and said throttle lever includes a throttle control plate mounted for common rotation with said control lever, a cam slot in said throttle control plate having a central portion extending at a uniform radius from said first axis and end portions extending from said central portion at increasing distances from said first axis, and a follower located on one end of said throttle lever and received in said throttle control plate slot for translation relative to said throttle control plate and for rotary movement relative to said throttle control plate.

9. A single lever control according to claim 1 wherein said housing includes opposed side wall members having an exterior surface, and wherein said control lever support means comprises a shaft journalled at the opposite ends by said side wall members, and further including means on said shaft and said control lever for connecting said control lever with either of the opposite ends of said shaft adjacent the exterior surface of the respective of said side wall members for common rotation of said control lever with said shaft.

10. A single lever control according to claim 7 wherein said means connecting said control lever and said shaft includes an axially extending recess in each end of said shaft including a plurality of circumferentially spaced, axially extending splines and an axially extending boss on said control lever adapted to be received in either of said shaft recesses and having a plurality of circumferentially spaced, axially extending splines adapted to mesh with said recess splines.

11. A single lever control according to claim 1 including means for releasably locking said control lever in the neutral position.

12. A single lever control according to claim 11 wherein said housing includes a side wall member having an exterior surface, wherein said control lever support means includes a shaft journalled by said side wall member for pivotal movement about said first axis, wherein said control lever includes a handle which is located exteriorly of said side wall member and at the lower end, is connected to said shaft for common rotation therewith, and said neutral lock means includes a circular plate mounted on said side wall member exterior surface coaxially with said first axis and interposed said side wall member and said control lever handle, said circular plate having a peripheral edge including a notch which extends inwardly from said peripheral edge toward said first axis and is located at a position corresponding to the neutral position of said control lever, a locking arm slidably mounted on said control handle for reciprocal movement relative to said circular plate peripheral edge and having a lower end portion adapted to be received in said notch, and means biasing said locking arm toward said circular plate peripheral edge.

13. A single lever control according to claim 1 wherein said warm-up lever includes a side link which has an upper end portion and extends generally perpendicular to said first axis and a handle which extends inwardly and generally perpendicularly from said upper end portion of said side link, and said housing includes a side portion having a recessed portion for receiving and accommodating pivotal movement of said warm-up lever side link and further includes a top portion having a recessed portion for receiving said warm-up lever handle.

14. A single lever control comprising a housing including opposed side wall members having an exterior surface, a main control lever, a shaft journalled at the opposite ends by said side wall members, means on said shaft and on said control lever for connecting said control lever with either of the opposite ends of said shaft adjacent the exterior surface of the respective of said side wall members for pivotal movement of said control lever about a first axis from a neutral position, through a shift position, and subsequently through a range of throttle advance positions, a warm-up lever carried by said housing for pivotal movement about a second axis between an idle position and a range of engine warm-up positions, a throttle lever adapted to actuate a remotely located throttle of an engine and carried by said warm-up lever for pivotal movement about a third axis spaced from said second axis, means connecting said control lever and said throttle lever for pivoting said throttle lever about said third axis in response to movement of said control lever from the neutral position to a throttle advance position and for permitting pivotal movement of said throttle lever in response to movement of said warm-up lever from the idle position, a gear shift lever adapted to actuate a remotely located clutch of the engine and carried by said housing for pivotal movement about a fourth axis between a neutral position and a drive position, means connecting said gear shift lever and said control lever for pivoting said gear shift lever from the neutral position to the drive position in response to movement of said control lever from the neutral position to a shift position and for preventing movement of said gear shift lever from the drive position when said control lever is moved beyond the shift position to the throttle advance position, a lockout lever pivotally mounted interiorly of said housing, means connecting said lockout lever and said warm-up lever for locating said lockout lever in a first position when said warm-up lever is in the idle position and for locating said lockout lever in a second position when said warm-up lever is in an engine warm-up position, and means connecting said lockout lever and said gear shift lever for permitting movement of said warm-up lever from the idle position when said control lever is in the neutral position, for preventing movement of said warm-up lever from the idle position when said control lever is displaced from the neutral position, for preventing movement of said gear shift lever from the neutral position when said warm-up lever is in an engine warm-up position and thereby also preventing movement of said control lever from the neutral position, and for permitting movement of said gear shift lever from the neutral position when said warm-up lever is in the idle position and thereby also permitting movement of said control lever from the neutral position.

15. A single lever control according to claim 14 wherein said means connecting said warm-up lever and said lockout lever includes a lockout plate fixedly mounted on said warm-up lever interiorly of said housing for common rotation with said warm-up lever, a cam slot in said lockout plate, and a follower on said lockout lever projecting into said lockout plate slot.

16. A single lever control according to claim 15 wherein said means connecting said lockout lever and said gear shift lever includes a surface extending on said gear shift lever and having an arcuate portion extending along a common radius from said fourth axis and a recess extending from said common radius portion inwardly toward said fourth axis and further includes a projection on said lockout lever, said projection being located in a position for engagement with said arcuate portion and thereby prevent pivotal movement of said warm-up lever from the idle position when said gear shift lever is in the drive position and being located in a position for travel into said recess when said gear shift lever is in the neutral position and thereby prevent pivotal movement of said gear shift lever from the neutral position when said warm-up lever is in an engine warm-up position.

17. A single lever control according to claim 16 wherein said lockout plate slot includes a main portion extending at a uniform radius from said third axis and an end portion extending from said main portion inwardly toward said third axis, and said lockout lever follower is located in said end portion of said lockout plate slot when said warm-up lever is in the idle position and, in response to movement of said warm-up lever from the idle position when said gear shift lever is in the neutral position, locates said lockout lever in the second position where said lockout lever follower can move along said main portion of said lockout plate slot and thereby permit said warm-up lever to be moved into an engine warm-up position.

18. A single lever control for the throttle and clutch of a marine propulsion device comprising a housing, a control lever rotatably mounted on said housing, a clutch element movably mounted inside said housing and adapted to actuate a remotely located clutch in response to movement of said clutch element, means operatively connecting said control lever and said clutch element to cause clutch element movement in respone to movement of said control lever, a throttle lever disposed inside said housing and adapted to actuate a remotely located throttle in response to movement of said throttle lever, said throttle lever having spaced ends, a warm-up lever pivotally mounted exteriorly of said housing, means pivotally connecting said warm-up lever to said throttle lever intermediate said ends thereof, means operatively connecting said control lever to said throttle lever adjacent one end thereof for providing relative rotation therebetween and for rocking said throttle lever about said means pivotally connecting said warm-up lever to said throttle lever whereby, when said warm-up lever is pivotally moved independently of movement of said control lever, said throttle lever is pivoted about said means connecting said throttle lever to said control lever, and when said control lever is pivotally moved independently of said warm-up lever, said throttle lever is pivoted about said means pivotally connecting said throttle lever to said warm-up lever, and means located wholly interiorly of said housing and operable independently of direct interengagement between said control lever and said warm-up lever for permitting pivotal movement of said warm-up lever from an idle position when said control lever is in a neutral position, for permitting pivotal movement of said control lever from the neutral position when said warm-up lever is in the idle position, for preventing pivotal movement of said warm-up lever from the idle position when said control lever is displaced from the neutral position, and for preventing pivotal movement of said control lever from the neutral position when said warm-up lever is displaced from the idle position.

19. A throttle control comprising a housing, a control lever, means rotatably mounting said control lever on said housing for movement relative to a first position to actuate a remotely located throttle in response to movement of said control lever, a throttle lever movably mounted within said housing and connected to said control lever for movement in response to control lever movement, said throttle lever having spaced ends, a warm-up lever, means pivotally mounting said warm-up lever on said housing for movement relative to an idle position, means pivotally connecting said warm-up lever to said throttle lever intermediate said ends thereof to cause throttle lever movement in response to warm-up lever movement from idle to actuate the throttle, and means located wholly interiorly of said housing and operable independently of said means pivotally connecting said warm-up lever to said throttle lever for permitting pivotal movement of said warm-up lever from the idle position when said control lever is in the first position, for preventing pivotal movement of said warm-up lever from the idle position when said control lever is displaced from the first position, for permitting pivotal movement of said control lever from the first position when said warm-up lever is in the idle position, and for preventing pivotal movement of said control lever from the first position when said warm-up lever is displaced from the idle position.

20. A single lever control comprising a housing including opposed side wall members having an exterior surface, a shaft having opposite ends journalled by said side wall members, a throttle lever disposed in said housing and adapted to actuate a remotely located throttle in response to movement of said throttle lever, a warm-up lever, means mounting said warm-up lever on one of said side wall members for pivotal movement from an idle position and connecting said warm-up lever to said throttle lever to provide movement of said throttle lever in response to movement of said warm-up lever from the idle position, a control lever, means on said control lever and on both of said ends of said shaft for selectively mounting said control lever on either of said opposite ends of said shaft for pivotal movement of said control lever exteriorly of said housing from a neutral position to a range of throttle advance positions and for pivotal movement of said shaft in common with the pivotal movement of said control lever, and means connecting said control lever and said throttle lever for moving said throttle lever in response to movement of said control lever from the neutral position to a throttle advance position.

21. A single lever control according to claim 20 wherein said means connecting said control lever and said shaft includes an axially extending recess in each end of said shaft including a plurality of circumferentially spaced, axially extending splines, and an axially extending boss on said control lever adapted to be received in either of said shaft recesses and having a plurality of circumferentially spaced, axially extending splines adapted to mesh with said recess splines.

22. A single lever control comprising a housing, a main control lever, means supporting said control lever from said housing for pivotal movement from a neutral position, through a shift position, and subsequently through a range of throttle advance positions, a throttle lever movably mounted inside said housing and connected to said control lever for movement in response to control lever movement, said throttle lever including opposed ends, a warm-up lever carried by said housing for pivotal movement between an idle position and a range of engine warm-up positions, means pivotably connecting said warm-up lever and said throttle lever intermediate the ends thereof, a gear shift lever adapted to actuate a remotely located clutch of the engine and carried by said housing for pivotal movement between a neutral position and a drive position, means connecting said gear shift lever and said control lever for pivoting said gear shift lever from the neutral position to the drive position in response to movement of said control lever from the neutral position to a shift position, and means interiorly of said housing connecting said warm-up lever and said gear shift lever for permitting movement of said warm-up lever from the idle position when said control lever is in the neutral position, for preventing movement of said warm-up lever from the idle position when said control lever is displaced from the neutral position, for preventing movement of said gear shift lever from the neutral position when said warm-up lever is in an engine warm-up position, and thereby also preventing movement of said control lever from the neutral position, and for permitting movement of said gear shift lever from the neutral position when said warm-up lever is in the idle position, and thereby also permitting movement of said control lever from the neutral position.

* * * * *